United States Patent
Wignarajah et al.

(10) Patent No.: US 10,783,027 B2
(45) Date of Patent: Sep. 22, 2020

(54) PREEMPTIVE CRASH DATA CAPTURE

(71) Applicant: Microsoft Technology Licensing, LLC, Redmond, WA (US)

(72) Inventors: Manodasan Wignarajah, Redmond, WA (US); Avneet Singh, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 205 days.

(21) Appl. No.: 15/993,562

(22) Filed: May 30, 2018

(65) Prior Publication Data

US 2019/0370104 A1 Dec. 5, 2019

(51) Int. Cl.
*G06F 11/07* (2006.01)
*G06F 11/36* (2006.01)

(52) U.S. Cl.
CPC ...... *G06F 11/0778* (2013.01); *G06F 11/0715* (2013.01); *G06F 11/366* (2013.01)

(58) Field of Classification Search
CPC ............. G06F 11/0778; G06F 11/0775; G06F 11/3466; G06F 11/3476; G06F 11/3495; G06F 11/3636; G06F 11/366
See application file for complete search history.

(56) References Cited

U.S. PATENT DOCUMENTS

| | | | |
|---|---|---|---|
| 2007/0283338 A1* | 12/2007 | Gupta | G06F 11/36 717/154 |
| 2008/0163015 A1* | 7/2008 | Kagan | G06F 11/2294 714/724 |
| 2008/0168242 A1* | 7/2008 | Eberbach | G06F 11/004 711/161 |
| 2009/0063651 A1* | 3/2009 | Brahmavar | G06F 11/0709 709/212 |
| 2012/0151251 A1* | 6/2012 | Donley | G06F 11/079 714/6.1 |
| 2012/0179936 A1* | 7/2012 | Masser | G06F 11/0709 714/38.11 |
| 2013/0198565 A1* | 8/2013 | Mancoridis | G06F 11/008 714/26 |
| 2016/0261455 A1* | 9/2016 | Su | H04L 41/069 |
| 2016/0350173 A1* | 12/2016 | Ahad | H04L 67/02 |
| 2017/0010935 A1* | 1/2017 | Vaden | G06F 11/0706 |
| 2019/0080258 A1* | 3/2019 | Eder | G06N 3/0454 |

* cited by examiner

*Primary Examiner* — Gabriel Chu

(57) ABSTRACT

Techniques for implementing preemptive crash data capture are provided. According to one set of embodiments, a computer system can determine that a failure has occurred with respect to an application running on the computer system and, in response to the failure, collect context information pertaining to the application's state at the time of the failure. If the failure subsequently causes the application to crash, the computer system can generate a crash dump that includes the collected context information.

19 Claims, 5 Drawing Sheets

PREEMPTIVE CRASH DATA CAPTURE

BACKGROUND

When a software application experiences a failure during its runtime operation, the application will either (1) handle the failure, recover, and continue with its operation, or (2) become unstable and crash (i.e., stop functioning and exit). In the latter case, the operating system (OS) on which the application runs will typically generate a crash dump, which is a dataset comprising diagnostic information regarding the crash. Among other things, this crash dump can be provided to the developer of the application so that the developer can try to identify and address, in a future update, the failure that originally led to the crash.

Since crash dumps are generated "post-crash" (i.e., after an application has already crashed), the diagnostic information that an OS includes in a conventional crash dump is generally limited to information available to the OS at that point in time. For example, the OS cannot include information regarding the state of an application prior to its crash, because by the time of crash dump generation the application has already stopped executing and its resources have been released. As a result, in many cases, conventional crash dumps are not detailed enough for application developers to determine why a crash occurred and how it can be fixed.

SUMMARY

Techniques for implementing preemptive crash data capture are provided. According to one set of embodiments, a computer system can determine that a failure has occurred with respect to an application running on the computer system and, in response to the failure, collect context information pertaining to the application's state at the time of the failure. If the failure subsequently causes the application to crash, the computer system can generate a crash dump that includes the collected context information.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide techniques for implementing "preemptive crash data capture"—in other words, collecting context information regarding the state of a software application after it has experienced a failure, but before the application has crashed. If the failure does result in an application crash, the collected context information can be included in the crash dump generated for the crash, which can significantly aid the developer of the application in identifying and addressing the failure that led to the crash's occurrence.

In certain embodiments, to minimize the overhead associated with preemptive crash data capture, a heuristic-based prediction mechanism can be used to predict which application failures will in fact result in crashes (rather than being successfully handled by the application). If the prediction mechanism determines (based on, e.g., past events/behavior) that a given failure will likely lead to a crash, it can trigger the collection of context information at the point of failure as mentioned above. However, if the prediction mechanism determines that a given failure will likely not lead to a crash, the collection step can be avoided. Thus, with this prediction mechanism, preemptive crash data capture can be implemented in a more efficient manner.

The foregoing and other aspects of the present disclosure are described in further detail in the sections that follow.

2. Example Computer System and High-Level Workflows

Figure 1:
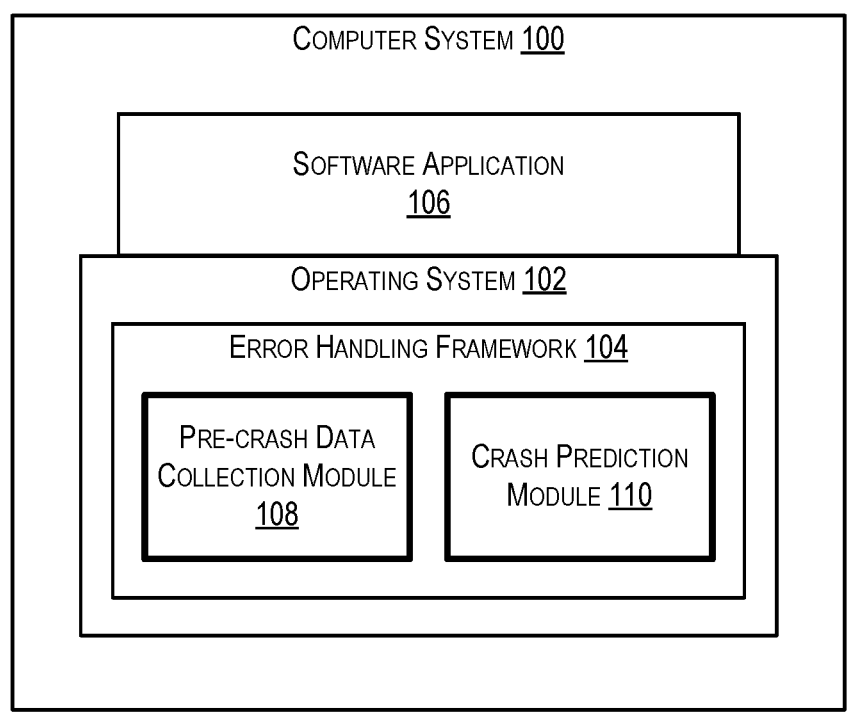
FIG. 1 is a simplified block diagram of a computer system according to certain embodiments.

FIG. 1 depicts an example computer system 100 in which embodiments of the present disclosure may be implemented. As shown, computer system 100 includes an operating system (OS) 102 comprising an error handling framework 104 and a software application 106 running on top of OS 102. OS 102 may be a desktop OS such as Microsoft Windows, Apple MacOS, or Linux, a mobile OS such as Apple iOS or Google Android, or any other type of OS known in the art. Error handling framework 104 is a component of OS 102 that enables OS 102/application 106 to handle failures encountered during their runtime operation. Error handling framework 104 also triggers crash dump generation when application 106 and other applications running on OS 102 crash. One example of error handling framework 104 is the Microsoft Windows Global Error Handler.

As noted in the Background section, if application 106 experiences a failure while it is running, one of two outcomes are possible: (1) the application successfully handles the failure, recovers, and continues with its operation, or (2) the application becomes unstable and crashes, resulting in the creation of a crash dump by error handling framework 104. This crash dump is often made available to the developer of the application to help the developer in diagnosing the crash and fixing the failure that caused it; however, due to the timing of crash dump generation (which occurs after application 106 has already crashed), conventional crash dumps usually only include a generic crash error code and API stack trace, which makes them of limited usefulness for debugging purposes.

To address this deficiency, computer system 100 of FIG. 1 is enhanced to include two novel software components: a pre-crash data collection module 108 and a crash prediction module 110. Although modules 108 and 110 are shown as being part of error handling framework 104, in other embodiments these modules may reside at a different location within the software stack of computer system 100.

Generally speaking, pre-crash data collection module 108 and crash prediction module 110 enable the creation of improved crash dumps via preemptive crash data capture (i.e., the collection of context information regarding the state of an application after it has experienced a failure, but before it crashes). In one set of embodiments, module 108 can implement a basic form of preemptive crash data capture by itself (i.e., without the help of crash prediction module 110) as shown in high-level workflow 200 of FIG. 2. Starting with block 202, application 106 can experience a failure during its runtime operation (caused by, e.g., an unexpected data value, an uninitialized pointer, or any other bug/error). At blocks 204 and 206, error handling framework 104 can detect or be notified of the failure and can activate pre-crash data collection module 108. In response, module 108 can collect context information pertaining to the state of application 106 at the time of the failure (block 208). This context information can include, e.g., the values of variables used by application 106, resources accessed by application 106, and so on. Finally, if the failure causes application 106 to crash, pre-crash data collection module 108 can make the context information collected at block 208 (or a subset thereof) available to error handling framework 104 (block 210), which in turn can generate (or trigger the generation of) a crash dump that includes the context information (block 212).

One drawback with workflow 200 is that, in the scenario where application 106 does not crash after a failure (i.e., the application recovers and continues its operation), pre-crash data collection module 108 still goes through the process of collecting context information for application 106 at block 208, even though no crash dump is ultimately generated. In this case, the collected information is simply discarded once error handling framework 104 becomes aware that the failure has been successfully handled or a predefined period of time has elapsed.

To avoid this, in another set of embodiments modules 108 and 110 can work in tandem to implement a more efficient variant of preemptive crash data capture that eliminates pre-crash data collection in failure scenarios where the application will likely recover (and thus not crash). This variant, referred herein as "preemptive crash data capture with heuristic-based prediction," is shown in high-level workflow 300 of FIG. 3. Blocks 302 and 304 of workflow 300 are substantially similar to blocks 202 and 204 of workflow 200 (i.e., application 106 experiences a failure and error handling framework 104 is notified). However, rather than immediately activating pre-crash data collection module 108 at this point, error handling framework 104 can invoke crash prediction module 110 to predict, using heuristics that take into account the past behavior/activity of application 106, whether the failure will actually cause the application crash (blocks 306, 308). In certain embodiments, crash prediction module 110 can employ a signature-based mechanism to perform this prediction (detailed in Section 3 below).

If crash prediction module 110 predicts that application 106 will not crash at block 308, pre-crash data collection module 108 is not activated and thus no pre-crash data capture is performed (block 310). In this case, if application 106 does end up crashing, a conventional crash dump will be generated.

On the other hand, if crash prediction module 110 predicts that application 106 will crash at block 308, pre-crash data collection module 108 can be activated and can capture context information for application 106 (block 312). The remainder of workflow 300 can then proceed in a manner similar to blocks 210 and 212 of workflow 200 (i.e., assuming a crash occurs, module 108 makes the collected context information available to error handling framework 104 (block 314), which generates a crash dump including the context information (block 316)).

With the functionality provided by modules 108 and 110 and illustrated in high-level workflows 200 and 300, a number of benefits are achieved. First, because the crash dumps generated via workflows 200 and 300 include application context information (e.g., variable values, etc.) collected at the point of failure, these crash dumps are significantly more useful to application developers than conventional crash dumps (which simply include generic error code/stack trace information collected at the time of crash). For example, application developers can leverage this context information to better understand how and why their applications failed and crashed, leading to quicker bug resolution and ultimately more robust and stable applications.

Second, through the use of crash prediction module 110, computer system 100 can advantageously avoid the compute and memory overhead associated with pre-crash data collection if a given failure will most likely not result in a crash. This makes the overall solution more efficient, which can be particularly important if system 100 is a power-constrained device (e.g., a mobile or wearable device).

Figure 2:
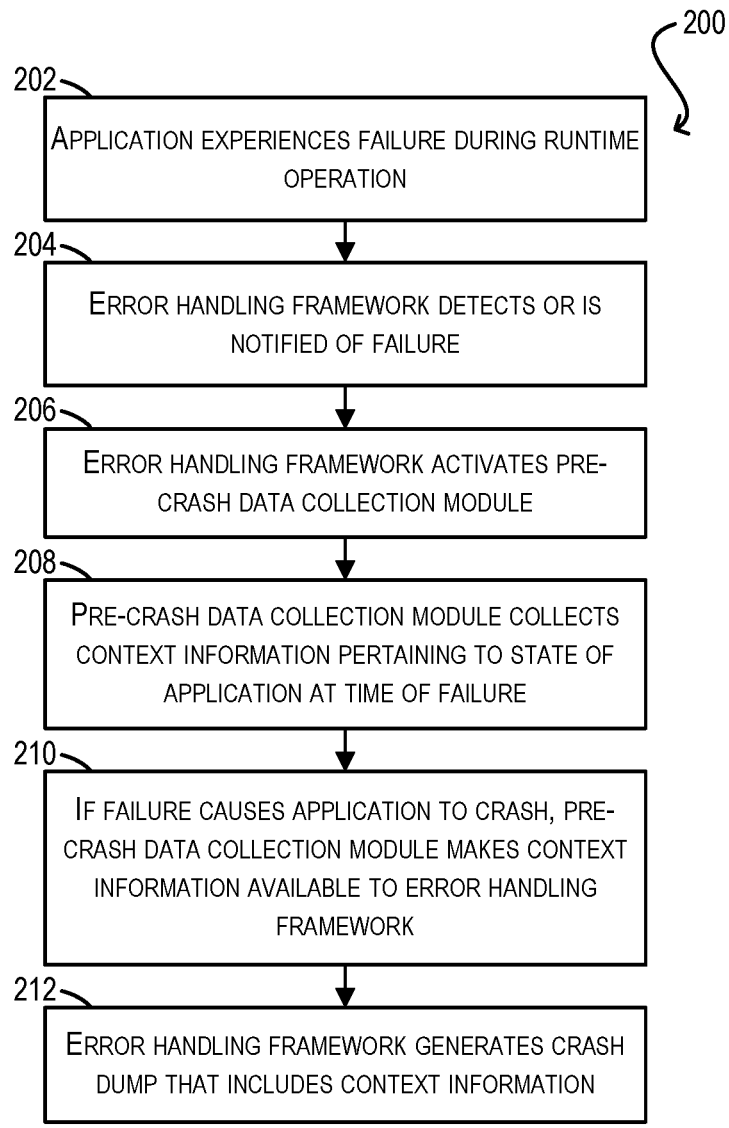
FIG. 2 depicts a high-level workflow for performing preemptive crash data capture according to certain embodiments.
Figure 3:
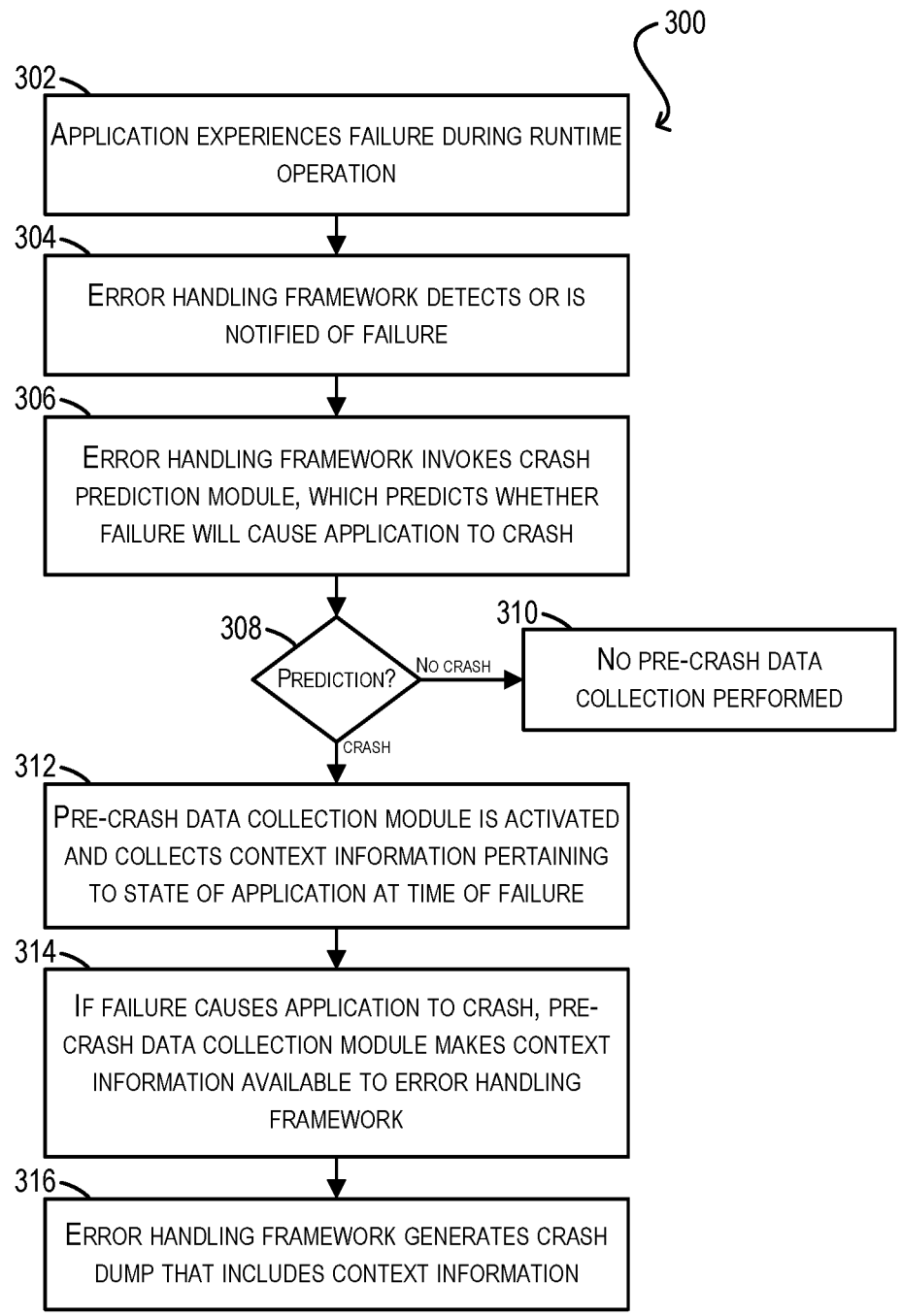
FIG. 3 depicts a high-level workflow for performing preemptive crash data capture with heuristic-based prediction according to certain embodiments.

It should be appreciated that FIGS. 1-3 are illustrative and not intended to limit embodiments of the present disclosure. For example, the various components shown in FIG. 1 may be arranged according to different configurations and/or may include subcomponents or functions not specifically described. One of ordinary skill in the art will recognize other variations, modifications, and alternatives.

3. Detailed Implementation

Figure 4:
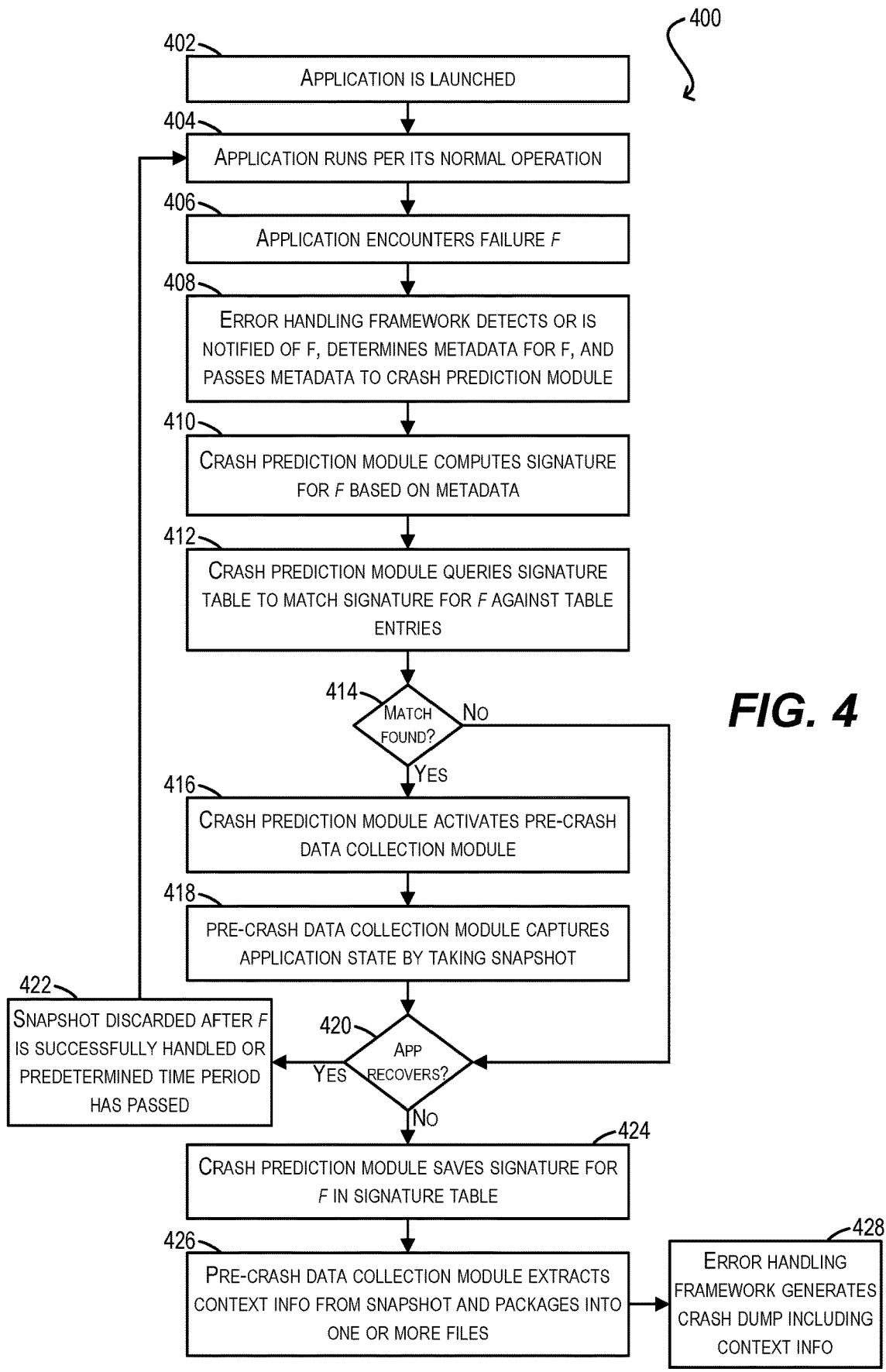
FIG. 4 depicts a more detailed workflow for performing preemptive crash data capture with heuristic-based prediction according to certain embodiments.

FIG. 4 depicts a workflow 400 that details one possible implementation of the high level "preemptive crash data capture with heuristic-based prediction" workflow of FIG. 3 according to certain embodiments. In particular, workflow 400 describes the use of a signature-based mechanism by module 110 for performing crash prediction and the use of a snapshot mechanism by module 108 for collecting pre-crash context information.

Starting with blocks 402 and 404, application 106 can be launched and can run per its normal operation (e.g., present a user interface, receive and process user inputs, etc.). At block 406, application 106 can encounter a failure f. As used herein, a failure is any type of error or exception that affects the ability of the application to move forward with its execution. In response, error handling framework 104 can detect (or be notified of) failure f, determine metadata pertaining to the application and/or failure f, and pass the metadata to crash prediction module 110 (block 408). Examples of metadata that may be determined at block 408 include an error code associated with f and information regarding the modules loaded by application 106 at the time of f.

At block 410, crash prediction module 110 can use the combination of application and failure metadata received from error handling framework 104 to compute a signature that identifies failure f. In one set of embodiments, this step can comprise providing the application/failure metadata as input to a hash function such as MD5 and using the hash value output by the hash function as the failure signature.

Crash prediction module 110 can then use the computed signature to query a signature table maintained on computer system 100 for application 106, where the signature table includes signatures of past failures experienced by application 106 that resulted in a crash (block 412). In some embodiments, this signature table may include failure signatures for various different versions of application 106 as well as various different versions of OS 102. In these cases, as part of the querying performed at block 412, crash prediction module 110 can filter the query results to only include signatures for the app and OS version currently running on computer system 100.

If the querying results in a match between the computed signature for failure f and an existing signature in the signature table, crash prediction module 110 can conclude that failure f will likely result in a crash (because it has before) and can activate, or trigger, pre-crash data collection module 108 (blocks 414 and 416). In response, pre-crash data collection module 108 can capture the state of application 106 by taking a snapshot of its allocated memory space, such that the memory pages in this memory space are marked as read-only (and any subsequent writes will trigger a page-on-write) (block 418). Alternatively, pre-crash data collection module 108 can create a copy of the application's local stack data and place this copy on the system heap, but this approach is less desirable since it requires more available memory and takes longer to execute, thereby potentially blocking the execution of application 106.

Once pre-crash data collection module 108 has taken the snapshot (or crash prediction module 110 determines that the signature for failure f is not found in the signature table), application 106 will either recover from for proceed down a path towards a crash (block 420). If the application is able to recover, pre-crash data collection module 108 can release/discard the snapshot from block 418 (if such a snapshot was taken) upon receiving an indication that failure f was handled, or upon the expiration of a predefined time period (e.g., 30 seconds) (block 422). The workflow can then return to block 404 so that application 106 can continue with its normal operation.

On the other hand, if application 106 is not able to recover at block 420, it will crash. In this case, crash prediction module 110 can save the signature for failure f in the signature table if it does not already exist there (along with any other applicable information, such as application version and OS version), thereby recording that failure f resulted in a crash (block 424). In addition, if a point-of-failure snapshot was taken at block 422, pre-crash data collection module 108 can extract from the snapshot context information that it deems relevant (e.g., variable values, etc.) and package this context information into one or more local files (block 426).

Finally, error handling framework 104 can generate (or trigger the generation of) a crash dump that incorporates the context information, if it exists, and workflow 400 can end (block 428). Although not shown, this crash dump can be uploaded from computer system 100 to a remote crash dump database, where it can be made available to the developer of application 106 for review/analysis. Further, workflow 400 can be repeated for subsequent launches of application 106 on computer system 100, which can cause pre-crash data collection module 108 to be triggered (again) if the same failure f is encountered on a subsequent run.

To further clarify the operation of workflow 400, the following listing outlines what occurs in an example scenario where a particular failure f that leads to a crash is experienced by application 106 twice (with no prior occurrences).

1. Application 106 is launched a first time and failure f occurs
2. Crash prediction module 110 computes signature for f and checks for a match in the application's signature table; no match is found
3. Application 106 crashes, crash prediction module 110 adds signature for f to signature table and error handling framework 104 generates a conventional crash dump
4. Application 106 is launched a second time and failure f occurs again
5. Crash prediction module 110 computes a signature for f and checks for a match in the application's signature table; this time a match is found
6. Pre-crash data collection module 108 takes snapshot of application's memory space
7. Application 106 crashes, pre-crash data collection module 108 extracts relevant context information from snapshot, and error handling framework 104 generates an improved crash dump that includes the context information 4. Other Aspects/Optimizations 4.1 Limiting the Number of Times Pre-Crash Data Collection is Triggered In some cases, it may not be desirable to collect pre-crash context information and include this information in a crash dump each time a given failure occurs. This is because the context information will presumably be similar across the crashes, and thus the application developer will typically only need a few (e.g., one or two) instances of this information in order to debug the crash/failure.

Accordingly, in certain embodiments the signature table can include a counter value for each failure signature that indicates the number of times the failure corresponding to the signature has resulted in a crash. If this counter reaches a predefined threshold of X or higher (which suggests that pre-crash data has been collected and included in a crash dump for this failure at least X−1 before), pre-crash data collection module 108 can refrain from collecting data for subsequent occurrences of the failure. The threshold X can be configurable on a per-application or system-wide basis.

4.2 Signature Cleanup

As mentioned previously, the signature table for application 106 can include failure signatures for multiple versions of the application, as well as multiple versions of the OS on which the application runs. In scenarios where the application or OS is upgraded from an older version to a newer version on computer system 100, the recorded signatures for the older app/OS versions are no longer relevant and will simply take up space in the table. Thus, to address this, such older signatures can be cleaned up (i.e., deleted from the signature table) on an ongoing basis.

In one set of embodiments, this cleanup process can be performed by module 108 or 110 within the context of workflow 400. For example, at the time of updating the signature table at block 424, crash prediction module 110 can identify and remove all signatures pertaining to older application and/or OS versions.

In other embodiments, this cleanup process can be performed by OS 102 at the time of upgrading application 106 or the OS itself.

4.3 Cross-System Signature Tables

The foregoing portions of this disclosure generally assume that the signature table for application 106 is maintained locally on computer system 100 and is only used to facilitate the prediction of application crashes on system 100. As an alternative to this, in some embodiments the signature table for application 106 (and corresponding signature tables for other applications) can be maintained on a remote server (i.e., in the cloud) and can be used to predict application crashes across a population of multiple user systems.

For example, assume a failure f first occurs on the system of user1 and results in a crash. This will not trigger pre-crash data collection on user1's system, since this is the first occurrence of the failure. However, the signature for f can be uploaded to the cloud-based signature table, where it is visible by other user systems. Further assume that failure f subsequently occurs on the system of a different user2. In this case, even though failure f did not previously occur on user2's system, the crash prediction module on user2's system can match the signature for f against the existing signature recorded by user1's system in the cloud-based signature table. User2's system can then proceed to perform pre-crash data collection for the failure based on the prior experience of user1. Thus, with this approach, the preemptive crash data capture components on each disparate system can learn from what has occurred within the entire population of systems.

5. Example Computer System Architecture

Figure 5:
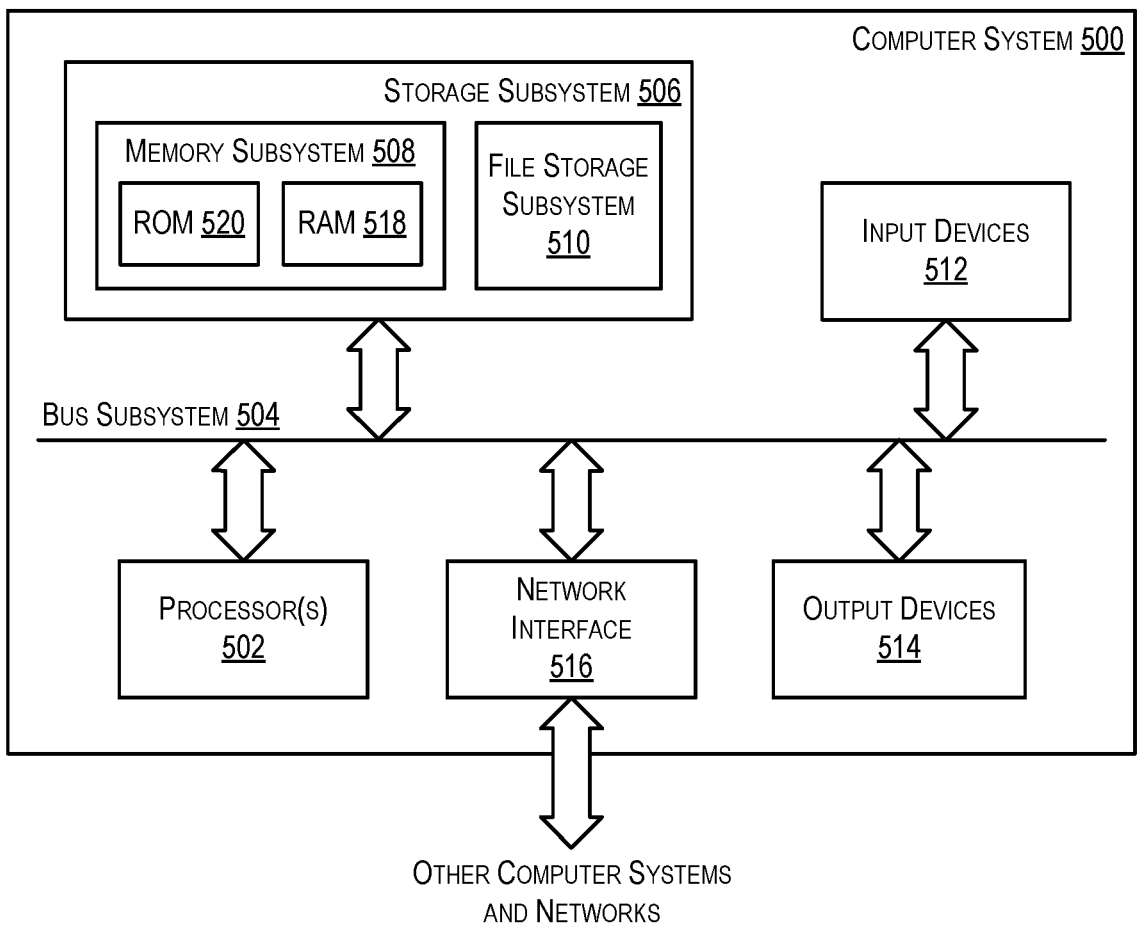
FIG. 5 depicts an example computer system architecture according to certain embodiments.

FIG. 5 depicts an example architecture of a computer system or device 500 according to certain embodiments. Computer system 500 (and/or equivalent systems/devices) may be used to implement computer system 100 of FIG. 1. As shown in FIG. 5, computer system 500 includes one or more processors 502 that communicate with a number of peripheral devices via a bus subsystem 504. These peripheral devices include a storage subsystem 506 (comprising a memory subsystem 508 and a file storage subsystem 510), user interface input devices 512, user interface output devices 514, and a network interface subsystem 516.

Bus subsystem 504 can provide a mechanism for letting the various components and subsystems of computer system 500 communicate with each other as intended. Although bus subsystem 504 is shown schematically as a single bus, alternative embodiments of the bus subsystem can utilize multiple busses.

Network interface subsystem 516 can serve as an interface for communicating data between computer system 500 and other computer systems or networks. Embodiments of network interface subsystem 516 can include, e.g., an Ethernet module, a Wi-Fi and/or cellular connectivity module, and/or the like.

User interface input devices 512 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 500.

User interface output devices 514 can include a display subsystem and/or non-visual output devices such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 500.

Storage subsystem 506 includes a memory subsystem 508 and a file/disk storage subsystem 510. Subsystems 508 and 510 represent non-transitory computer-readable storage media that can store program code and/or data that provide the functionality of embodiments of the present disclosure.

Memory subsystem 508 includes a number of memories including a main random access memory (RAM) 518 for storage of instructions and data during program execution and a read-only memory (ROM) 520 in which fixed instructions are stored. File storage subsystem 510 can provide persistent (i.e., non-volatile) storage for program and data files, and can include a magnetic or solid-state hard disk drive, an optical drive along with associated removable media (e.g., CD-ROM, DVD, Blu-Ray, etc.), a removable or non-removable flash memory-based drive, and/or other types of storage media known in the art.

It should be appreciated that computer system 500 is illustrative and other configurations having more or fewer components than computer system 500 are possible.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims.

For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A computer system comprising:
   a processor; and
   a computer readable storage medium having stored thereon program code that, when executed by the processor, causes the processor to:
   determine that a failure has occurred with respect to an application running on the computer system;
   in response to the failure, predict whether the failure will cause the application to crash;
   if the failure is predicted to cause the application to crash, collect context information pertaining to a state of the application; and
   if the failure subsequently causes the application to crash, generate a crash dump that includes the collected context information.

2. The computer system of claim 1 wherein if the processor predicts that the failure will not cause the application to crash, the processor refrains from collecting the context information.

3. The computer system of claim 1 wherein the processor predicts whether the failure will cause the application to crash by:

generating a signature for the failure;
comparing the signature against one or more failure signatures stored in a signature table, the one or more failure signatures stored in the signature table corresponding to failures of the application that previously caused the application to crash; and
if a match is found between the signature and the one or more failure signatures stored in the signature table, predicting that the failure will cause the application to crash.

4. The computer system of claim 3 wherein generating the signature for the failure comprises:
computing a hash of metadata associated with the application and the failure.

5. The computer system of claim 4 wherein the metadata associated with the application and the failure comprises an error code and a list of one or more application modules active at the time of the failure.

6. The computer system of claim 3 wherein the signature table is stored locally on the computer system and includes failure signatures previously generated solely by the computer system.

7. The computer system of claim 3 wherein the signature table is stored on a remote server and includes failure signatures previously generated by a plurality of computer systems.

8. The computer system of claim 3 wherein the program code further causes the processor to:
save the signature in the signature table if the failure causes the application to crash; and
discard the signature if the application does not cause the application to crash.

9. The computer system of claim 8 wherein saving the signature in the signature table comprising:
saving, with the signature, a current version number of the application and a current version number of an operating system (OS) of the computer system.

10. The computer system of claim 9 wherein failure signatures in the signature table that are associated with application version numbers that are older than the current version number of the application, or with OS version numbers that are older than the current version number of the OS, are deleted from the signature table on an ongoing basis.

11. The computer system of claim 1 wherein the context information includes values of variables used by the application at the time of the failure.

12. The computer system of claim 1 wherein collecting the context information comprises taking a snapshot of a memory space allocated to the application.

13. The computer system of claim 1 wherein if the failure does not cause the application to crash, the context information is deleted after a predetermined period of time.

14. The computer system of claim 1 wherein, prior to collecting the context information, the processor determines whether the failure has previously caused the application to crash at least a threshold number of times.

15. The computer system of claim 14 wherein if the processor determines that the failure has previously caused the application to crash at least the threshold number of times, the processor refrains from collecting the context information.

16. A method comprising:
determining, by a computer system, that a failure has occurred with respect to an application running on the computer system;
in response to the failure, predicting, by the computer system, whether the failure will cause the application to crash;
the failure is predicted to cause the application to crash, collecting, by the computer system, context information pertaining to a state of the application; and
if the failure subsequently causes the application to crash, generating, by the computer system, a crash dump that includes the collected context information.

17. The method of claim 16 further comprising
if the failure is not predicted to cause the application to crash, refraining from collecting the context information.

18. A non-transitory computer readable storage medium having stored thereon program code executable by a computer system, the program code causing the computer system to:
determine that a failure has occurred with respect to an application running on the computer system;
in response to the failure, predict whether the failure will cause the application to crash;
if the failure is predicted to cause the application to crash, collect context information pertaining to a state of the application; and
if the failure subsequently causes the application to crash, generate a crash dump that includes the collected context information.

19. The non-transitory computer readable storage medium of claim 18 wherein
if the failure is not predicted to cause the application to crash, refrain from collecting the context information.

* * * * *